(12) United States Patent
Rolwes

(10) Patent No.: US 11,648,829 B2
(45) Date of Patent: May 16, 2023

(54) ASSEMBLY AND METHOD FOR MOVING A COVER

(71) Applicant: Webasto SE, Stockdorf (DE)

(72) Inventor: Jan Rolwes, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 16 days.

(21) Appl. No.: 17/603,116

(22) PCT Filed: May 5, 2020

(86) PCT No.: PCT/EP2020/062439
§ 371 (c)(1),
(2) Date: Oct. 12, 2021

(87) PCT Pub. No.: WO2020/233980
PCT Pub. Date: Nov. 26, 2020

(65) Prior Publication Data
US 2022/0185081 A1 Jun. 16, 2022

(30) Foreign Application Priority Data
May 17, 2019 (DE) .......................... 102019113142.1

(51) Int. Cl.
*B60J 7/057* (2006.01)
*B60J 7/02* (2006.01)
*B60J 7/043* (2006.01)

(52) U.S. Cl.
CPC ............... *B60J 7/057* (2013.01); *B60J 7/024* (2013.01); *B60J 7/0435* (2013.01)

(58) Field of Classification Search
CPC . B60J 7/024; B60J 7/0435; B60J 7/057; B60J 7/0573; B60J 7/043; B60J 7/05; B60J 7/053
(Continued)

(56) References Cited

U.S. PATENT DOCUMENTS

| 5,228,743 A | 7/1993 | Regner |
| 6,012,768 A | 1/2000 | Nabuurs et al. |

(Continued)

FOREIGN PATENT DOCUMENTS

| DE | 3809458 A1 | 10/1989 |
| DE | 69825945 T2 | 9/2005 |

(Continued)

OTHER PUBLICATIONS

International Search Report for PCT/EP2020/062439 dated Jul. 28, 2020, in English and German (6 pages).

(Continued)

*Primary Examiner* — Dennis H Pedder
(74) *Attorney, Agent, or Firm* — Fitch, Even, Tabin & Flannery, LLP

(57) ABSTRACT

An assembly for moving a vehicle roof cover may have a mechanical component coupled to the cover; a carriage guided in a guide rail; and a deployment element which is extended in an elongate manner along a longitudinal axis. The mechanical component may be coupled to the deployment element at a first end of said deployment element, to transmit a movement of the carriage along a longitudinal direction in sections to the mechanical component. A locking pin may be arranged at a second end of the deployment element; the locking pin can be rotated about the longitudinal axis of the deployment element, movable between a first state and a second state, wherein the deployment element is locked in the first state preventing movement along the longitudinal direction relative to the carriage, and is locked in the second state preventing movement along the longitudinal direction relative to the guide rail.

15 Claims, 12 Drawing Sheets

Figure 1:
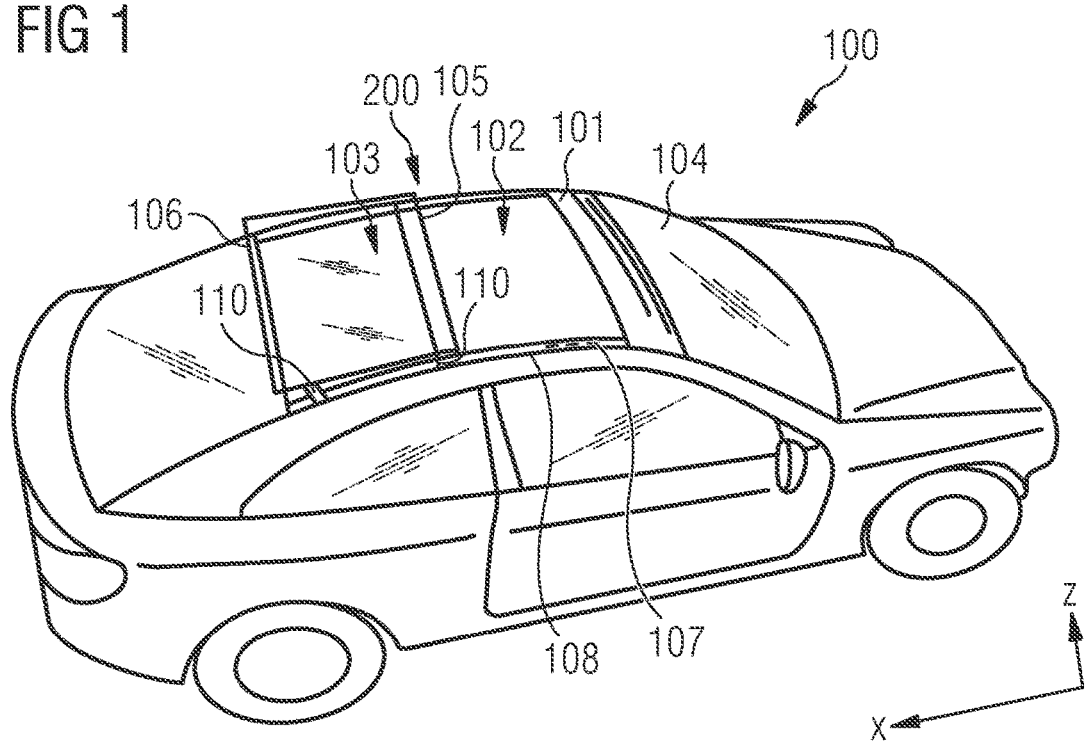

(58) Field of Classification Search
USPC ............... 296/223, 222, 221, 216.02–216.05
See application file for complete search history.

(56) References Cited

U.S. PATENT DOCUMENTS

| | | |
|---|---|---|
| 2009/0079234 A1 | 3/2009 | Faerber |
| 2013/0161983 A1 | 6/2013 | Geurts et al. |

FOREIGN PATENT DOCUMENTS

| | | |
|---|---|---|
| DE | 102006010755 A1 | 9/2007 |
| DE | 102006045632 B3 | 3/2008 |
| DE | 102012106545 A1 | 1/2014 |
| DE | 102016220991 A1 | 4/2018 |
| EP | 2607125 A1 | 6/2013 |
| JP | 2005-282860 A | 10/2005 |
| JP | 2006-062395 A | 3/2006 |

OTHER PUBLICATIONS

Parent Application No. DE 10 2019 113 142.1; Examination Report dated Feb. 17, 2020. (In German with English machine translation).
Decision to Grant from Japanese Application No. 2021-568148; dated Dec. 6, 2022; Japanese with English machine translation (5 pages).

ASSEMBLY AND METHOD FOR MOVING A COVER

CROSS-REFERENCE TO RELATED APPLICATION

This application is a U.S. national phase application filed under 35 U.S.C. § 371 of International Application No. No. PCT/EP2020/062439, filed May 5, 2020, designating the United States, which claims priority from German Patent Application Number DE 10 2019 113 142.1, filed May 17, 2019, which is hereby incorporated herein by reference in its entirety for all purposes.

FIELD

An assembly for moving a cover for a vehicle roof is specified. In addition, a method for moving a cover for a vehicle roof is specified.

BACKGROUND

Assemblies of this kind with a cover for a vehicle roof are used, for example, firstly to raise the rear area of the cover for opening by a deployment mechanism, starting from a closed position for closing a roof opening, and then to move the cover into an open position. In relation to this, DE 10 2006 045 632 B3 describes a spoiler roof, for example. With spoiler roofs, a deployment lever is first turned at a rear edge with respect to the opening direction, in order to raise the rear edge of the cover. The cover is displaced in the opening direction relative to the deployment lever, in order to free a roof opening at least partially. In this case, the deployment lever is held in place relative to the rest of the vehicle roof and is not displaced in the opening direction together with the cover. This is different, for example, in the case of so-called externally guided sliding roofs, in which the deployment lever at the rear edge of the cover is displaced in the opening direction, together with the cover, relative to the rest of the vehicle roof.

SUMMARY

It is desirable for an assembly for moving a cover for a vehicle roof to be specified, which allows reliable operation. It is furthermore desirable for a method for moving a cover for a vehicle roof to be specified, which can be reliably implemented.

An assembly for moving a cover for a vehicle roof has a mechanical component. The mechanical component is coupled to the cover. By way of example, the mechanical component is a deployment lever, in particular a deployment lever which is assigned to a rear edge of the cover in the main direction of travel.

The assembly has a carriage. The carriage is guided in a guide rail. The assembly has a deployment element. The deployment element is extended in an elongate manner along a longitudinal axis. The mechanical component is coupled to the deployment element at a first end of said deployment element. A movement of the carriage along a longitudinal direction can be transmitted in sections to the mechanical component. A locking pin is arranged at a second end of the deployment element. The locking pin can be rotated about the longitudinal axis of the deployment element. Consequently, the locking pin can be moved between a first state and a second state. The deployment element is locked in the first state preventing movement along the longitudinal direction relative to the carriage. The deployment element is locked in the second state preventing movement along the longitudinal direction relative to the guide rail.

The deployment element can therefore be locked by means of the rotatable locking pin. Similarly, the mechanical component can also be locked by rotating the locking pin and by means of the deployment element. Rotation for locking purposes uses a three-dimensional lock. Reliable locking and unlocking is therefore achieved. This also allows a reduction in switching noises and/or friction losses, for example. The force vectors occurring during operation can be set more flexibly when the framework conditions otherwise remain the same. In particular, locking perpendicular to the longitudinal axis is possible.

According to at least one embodiment, the deployment element comprises a cable with compressive and tensile strength. For example, the deployment element is a cable with compressive and tensile strength. The locking pin is attached to the cable, for example. Further elements may also be attached to the cable. A cable can be used flexibly and reliably as the deployment element. In addition, a cable is comparatively inexpensive and easy to manufacture for a wide variety of assemblies. Furthermore, a cable has a torsion spring action. This is beneficial for locking and unlocking in connection with the rotational movement of the locking pin. The cable is configured in the manner of a drive cable, for example, which is used in the region of the roof assemblies, in order to transmit drive energy from an electric motor to the drive mechanism.

According to at least one embodiment, the carriage has a carriage slot. The carriage slot interacts with the locking pin. The locking pin can moved between the first state and the second state by means of the carriage slot. The carriage slot is formed in such a manner that it rotates the locking pin about the longitudinal direction during a longitudinal movement of the carriage slot. The carriage is a drive carriage, for example, which is connected to a drive cable.

The carriage is configured to cause a raising and lowering, and also a longitudinal displacement, of the cover.

According to at least one embodiment, the carriage slot has a helical shape. The carriage slot runs in a spiral shape. The carriage slot runs in a screw shape. In particular, the pitch or the radius of the carriage slot changes along its course. To this extent, it is possible for the course of the carriage slot to deviate from that of an ideal helix.

According to at least one embodiment, the carriage slot has a first region extending along the vertical direction. The carriage slot has a second region extending along the longitudinal axis. The first region and the second region are arranged spaced apart from one another along a transverse direction. In particular, the first region and the second region are also arranged spaced apart from one another along the longitudinal direction and along the vertical direction. The first region and the second region are therefore spaced apart from one another in all three spatial directions. This allows the locking pin to rotate when it is moved along the carriage slot.

According to at least one embodiment, a slot course of the carriage slot comprises one component in the longitudinal direction, one component in the vertical direction, and one component in the transverse direction. The slot course of the carriage slot therefore extends along all three spatial directions at least in sections in each case.

According to at least one embodiment, the guide rail has a locking slot. The locking slot interacts with the locking pin. This allows a movement of the locking pin between the first state and the second state. The locking slot is formed in a slot housing made of plastic, for example, which is connected to the part of the guide rail in which the carriage is guided. The locking slot is designed to rotate the locking pin about the longitudinal axis, when said locking pin moves in the locking slot along the longitudinal direction.

According to at least one embodiment, the locking slot has a helical shape. The helical shape of the locking slot and the helical shape of the carriage slot are, in particular, configured to run in opposite directions to one another. Compared with the carriage slot, the locking slot has a spiral shape and/or a screw shape. The pitch and/or the radius of the slot changes along the locking slot, in particular. To this extent, it is possible for the locking slot to deviate from the ideal helix.

According to at least one embodiment, the locking slot has a first region extending along a transverse direction. According to one embodiment, the locking slot has a second region extending along the longitudinal axis. The first region and the second region are arranged spaced apart from one another along the vertical direction. In particular, the first region and the second region of the locking slot are, in addition, also arranged spaced apart from one another along the longitudinal direction and along the transverse direction. The first region and the second region of the locking slot are therefore arranged spaced apart from one another in all three spatial directions. This allows a reliable rotation of the locking pin when it is moved along the locking slot. In particular, the first region is oriented perpendicularly to the longitudinal direction. This allows the locking pin to be reliably locked along the longitudinal direction.

According to at least one embodiment, the locking slot has a slot course. The slot course of the locking slot has one component in the longitudinal direction, one component in the vertical direction, and one component in the transverse direction. The slot course therefore extends along all three spatial directions at least in sections in each case.

According to at least one embodiment, the locking pin projects through the locking slot in the first state. In the first state, the locking pin is engaged with the carriage slot. Consequently, it is possible that when there is a relative movement between the carriage slot and the locking slot, the locking pin is rotated about the longitudinal axis.

According to at least one embodiment, the locking pin is rigidly fixed to the deployment element. For example, the locking pin is formed from a plastic and directly molded, injection-molded, and/or foamed onto the deployment element. In the region in which it is fastened to the deployment element, for example, the locking pin cannot be rotated relative to said deployment element. The locking pin is rotated by rotating the deployment element. For example, the deployment element is inherently rotatable and twistable. In accordance with further embodiments, the locking pin can be rotated relative to the deployment element, so that the rotational movement can be executed. By way of example, the locking pin is fastened to the deployment element by means of a swivel joint.

According to at least one embodiment, the locking pin has a flexible projection. In the second state, the flexible projection engages with a groove in the guide rail. The locking pin is therefore held securely and reliably in a locked position in the second state. An unwanted departure from the position in the second state is thereby avoided.

A method for moving a cover for a vehicle roof is specified according to a further aspect. The method is implemented by means of an assembly described here, for example, according to at least one embodiment. Features, developments, and advantages of the assembly also apply to the method, and vice versa.

A deployment element which extends in an elongate manner along a longitudinal axis is displaced along a longitudinal direction. The deployment element comprises a locking pin. The locking pin is therefore displaced along the longitudinal direction together with the deployment element, in particular.

A mechanical component for moving the cover is moved by displacing the deployment element. The locking pin is rotated about the longitudinal axis of the deployment element. In this way, the locking pin is moved between a first state and a second state. The deployment element is locked in the first state preventing movement along a longitudinal direction relative to a carriage. The locking element is locked in the second state preventing movement along the longitudinal direction relative to a guide rail.

The locking and unlocking of the deployment element relative to the guide rail therefore takes place by rotating the locking pin. This allows reliable locking.

Further advantages, features and developments result from the following examples explained in conjunction with the figures. Elements which are identical, of the same kind, and produce the same effect can be provided with the same reference sign across all drawings.

BRIEF DESCRIPTIONS OF THE DRAWINGS

Figure 2:
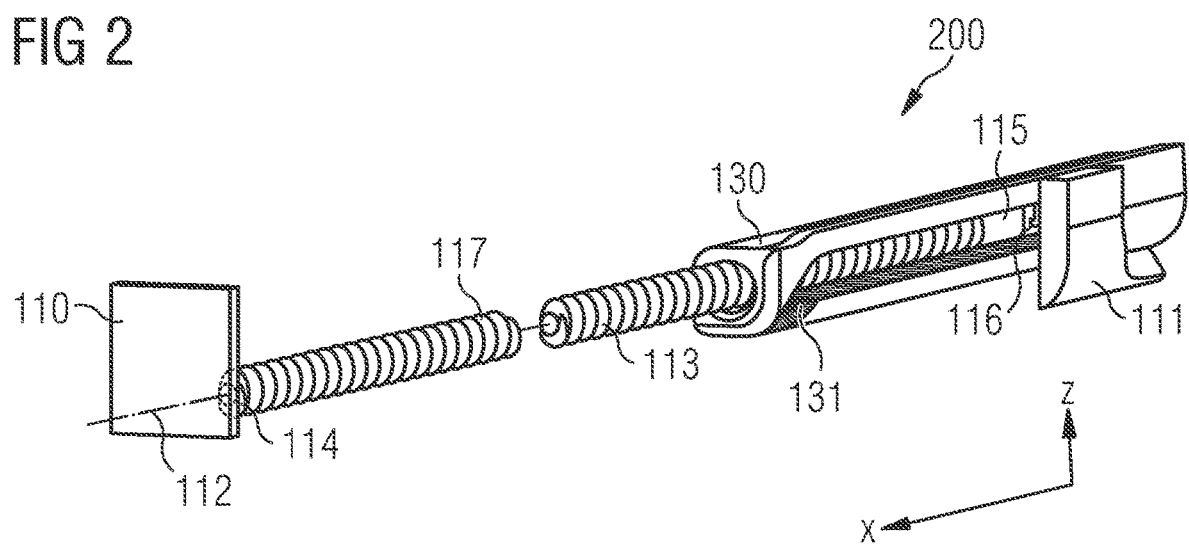
Figure 3:
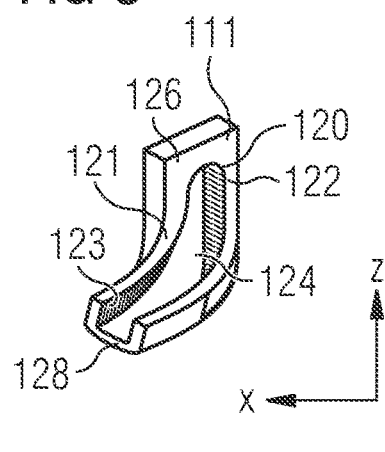
Figure 16:
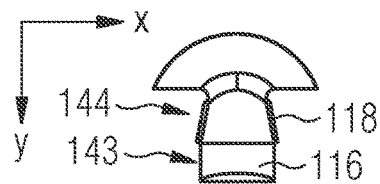
Figure 17:
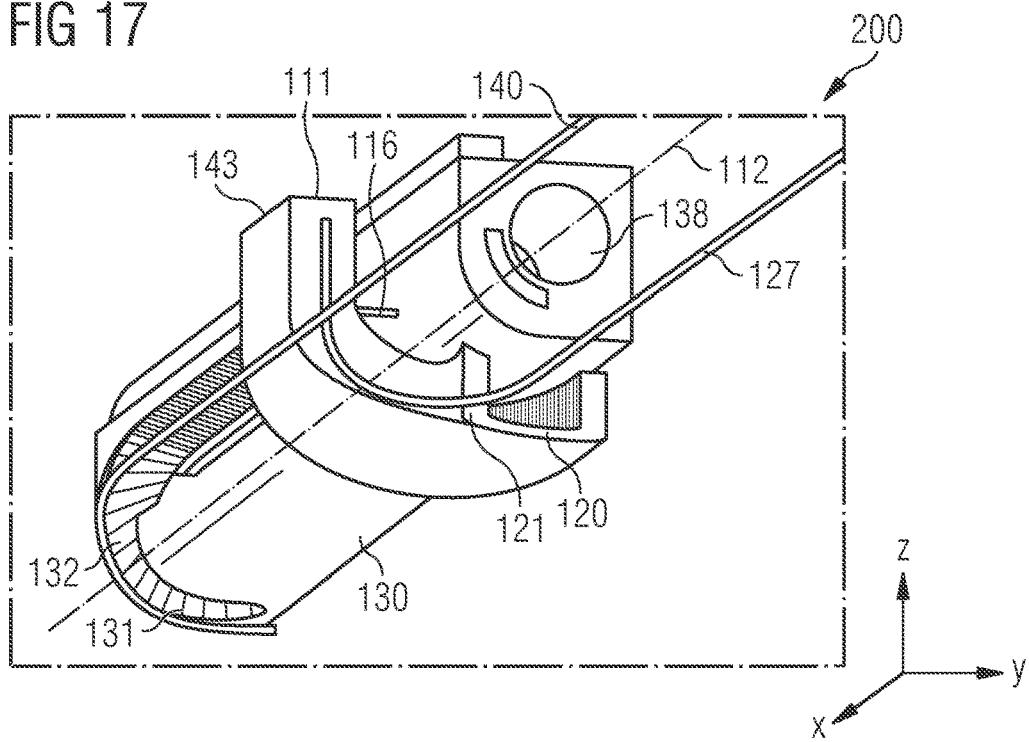
Figure 18:
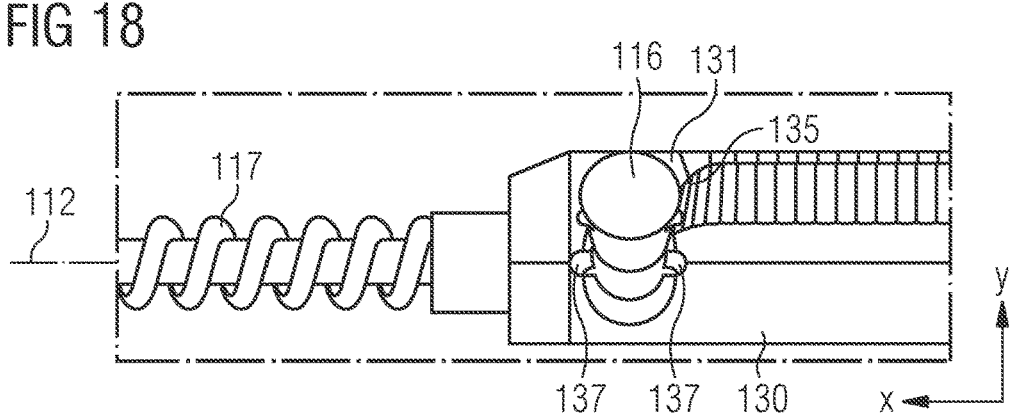
Figure 19:
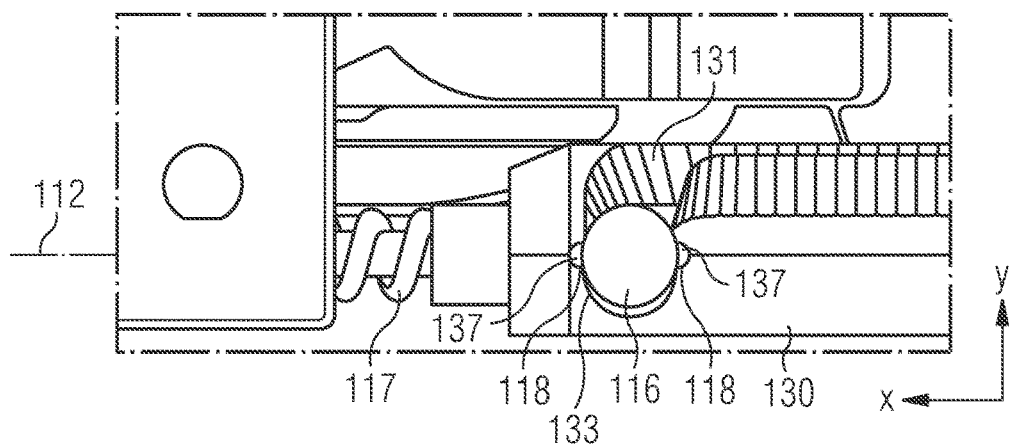

In the drawings:

FIG. 1 shows a schematic depiction of a vehicle according to an exemplary embodiment, FIG. 2 shows a schematic depiction of an assembly according to an exemplary embodiment, FIGS. 3 to 6 show schematic depictions of a carriage slot according to an exemplary embodiment, FIGS. 7 to 11 show schematic depictions of a locking slot according to an exemplary embodiment, FIGS. 12 to 16 show schematic depictions of a deployment element according to an exemplary embodiment, FIG. 17 shows a schematic depiction of an assembly according to an exemplary embodiment, FIGS. 18 and 19 show schematic depictions of the locking pin at different times in the movement sequence, and FIGS. 20A, 20B to FIGS. 26A, 26B show schematic depictions of an assembly according to an exemplary embodiment at different times in a movement sequence.

DETAILED DESCRIPTION

FIG. 1 shows a vehicle 100 according to an exemplary embodiment. The vehicle 100 has a vehicle roof 101. A cover 103 is arranged on the vehicle roof 101. The cover 103 is movable relative to the rest of the vehicle roof 101, for example. A roof opening 102 can therefore either be closed by the cover 103 or left partially open.

The vehicle has a windscreen 104. The cover 103 has a front edge 105 which faces the windscreen 104 when in the operative state. A rear edge 106 of the cover 103 faces away from the windscreen 104 along a longitudinal direction X.

The movement of the cover 103 is realized by means of a deployment mechanism. The deployment mechanism has a guide rail 107, for example, which is connected to the vehicle roof 101. A drive cable 108 is guided in the guide rail, for example. The drive cable is in contact with an electrical drive motor and further components of the deployment mechanism, for example. The deployment mechanism has an assembly 200 which is explained in greater detail below.

Terms used to indicate location or direction, such as behind or in front of, above or below, left or right, relate to a longitudinal vehicle axis and a customary driving direction of a vehicle 100 which is ready for use. The longitudinal vehicle axis can also be referred to as a horizontal axis or X-axis in the associated X-direction. The transverse vehicle axis can also be referred to as a horizontal axis or Y-axis in the associated Y direction. The perpendicular vehicle axis may also be referred to as the vertical axis or Z-axis in the associated Z direction. The vertical direction, the transverse direction, and the longitudinal direction are, in particular, each oriented perpendicularly to one another.

FIG. 2 shows the assembly 100 in accordance with an exemplary embodiment. The assembly 200 has a carriage 111. The carriage 111 is only depicted as a detail in FIG. 2. The carriage 111 is guided in the guide rail 107.

The assembly 100 has a deployment element 113. The deployment element 113 is extended along a longitudinal axis 112 in an elongate manner. The deployment element 113 has a substantially greater extent along the longitudinal axis 112 than transversely to the longitudinal axis 112.

The assembly 200 has a slot housing 130. The slot housing is formed from a plastic, for example, and rigidly coupled to the guide rail 107.

The deployment element 113 is coupled to a mechanical component 110 by a first end 114. The mechanical component 110 is, for example, a deployment lever for moving the cover 103 along the vertical direction Z. According to further exemplary embodiments, the mechanical component 110 is another element, for example a front deployment lever for moving the cover 103.

For example, the cover 103 is configured in the manner of a spoiler roof. A rear deployment lever, which is assigned to the rear edge 106, is locked so as to be immovable relative to the guide rail 107, once the rear edge 106 has been raised in the Z direction, starting from a closed position. In the closed position, the roof opening 102 is closed by the cover 103. When there is a subsequent displacement of the cover 103 backwards in the longitudinal direction X, the rear deployment lever 110 is not moved along with the cover 103. The locking of the rear deployment lever is realized by means of the assembly 200, for example.

A locking pin 116 is arranged at a second front end 115 of the deployment element 113. The locking pin 116 is made of plastic, for example. The locking pin 116 is, in particular, rigidly connected to the deployment element 113. The locking pin 116 projects radially beyond the deployment element 113. The main extending direction of the locking pin 116 runs transversely to the longitudinal axis 112 of the deployment element 113. The locking pin 116 projects, in particular, perpendicularly beyond the deployment element 113.

The deployment element 113 is configured as a cable 117 with compressive and tensile strength, for example. The cable 117 is configured in the manner of the drive cable 108, for example. The drive cable 108 and the cable 117 are configured separately to one another.

The slot housing 113 has a locking slot 131. The locking pin 116 is guided in the locking slot 131. The locking pin 116 can be displaced in the locking slot 131 relative to the slot housing 130. In particular, the locking pin 116 is constantly arranged in the locking slot 131 during operation.

FIGS. 3 to 6 show a detail of the carriage 111 according to an exemplary embodiment in different views.

The carriage 111 has a carriage slot 120. The carriage slot 120 is used for guiding the locking pin 116. During operation, the locking pin 116 is guided at least temporarily in the carriage slot 120. The locking pin 116 leaves the carriage slot 120 at least temporarily. When the locking pin 116 is not arranged in the carriage slot 120, it is possible for the carriage 111 to move independently of the locking pin 116.

The carriage slot 120 has a helical shape 121. The carriage slot comprises a first region 122. The first region 122 extends substantially in the Z direction. The carriage slot 120 comprises a second region 123. The second region 123 extends substantially in the X direction.

Figure 4:
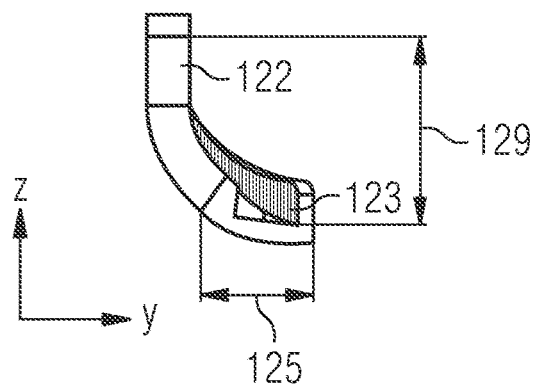
Figure 5:
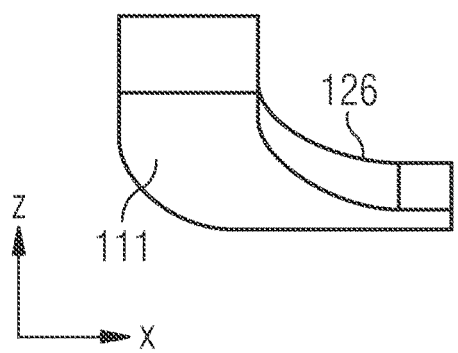
Figure 6:
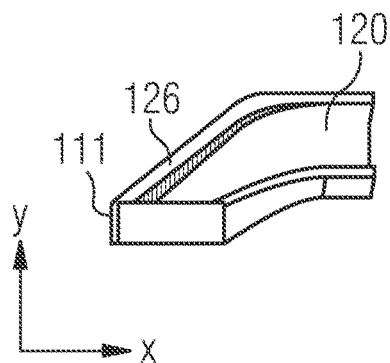
Figure 7:
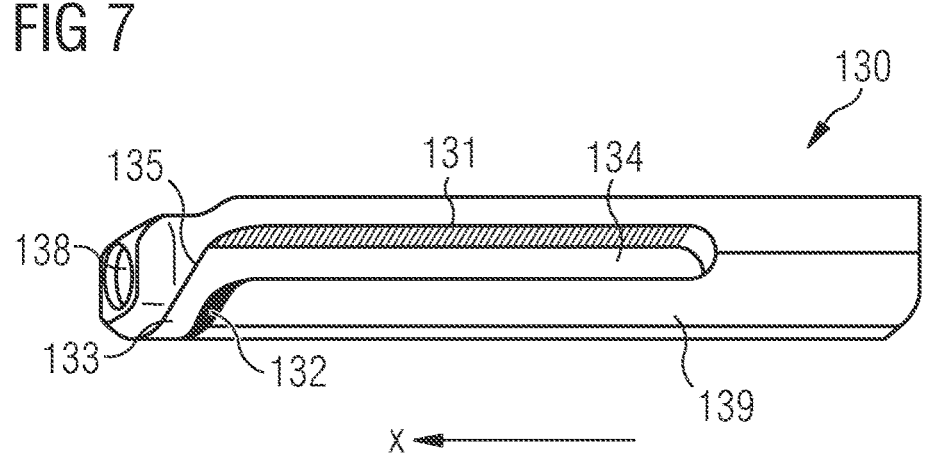
Figure 8:
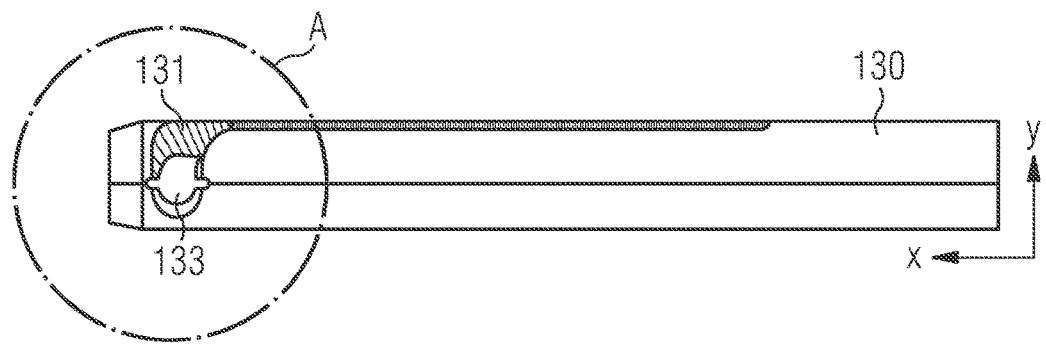
Figure 9:
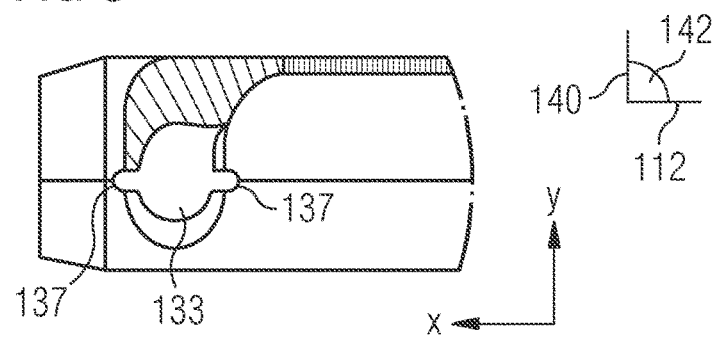
Figure 10:
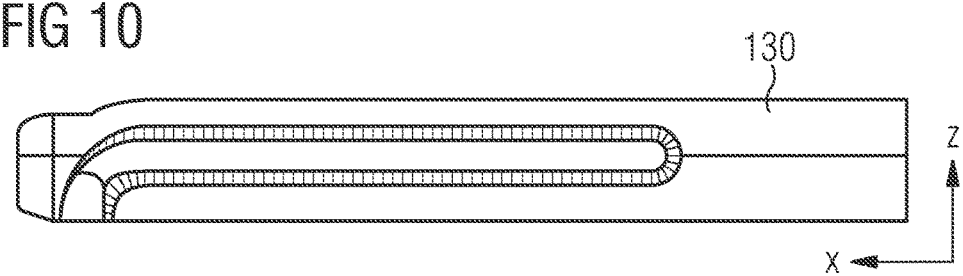

The first region 122 and the second region 123 are spaced apart from one another in the X direction, the Y direction, and also in the Z direction. Along the transverse direction Y, the first region 122 and the second region 123 have an interval 125 between them (FIG. 4). Along the vertical direction Z, the first region 122 and the second region 123 have an interval 129 between them (FIG. 4). The intermediate region 124, which has a particularly curved course, is arranged between the first region 122 and the second region 123. The carriage wall 126 therefore delimits the carriage slot 120 in such a manner that said carriage slot has a three-dimensional slot course 127 (FIG. 17). Particularly in the intermediate region 124, the slot course 127 has a component along the longitudinal direction X and a component in the transverse direction Y, and also a component in the vertical direction Z. The part of the carriage wall 126 closing off the base region undergoes a 90° turn between the first region 122 and the second region 123.

The carriage slot 120 has an open end 128 in the second region 123. It is possible for the locking pin 116 to be uncoupled from the carriage slot 120, and coupled in the carriage slot 120, at the open end 128.

Starting with the cover 103 in the closed position, the locking pin 116 first moves along the carriage slot 120, for example, and then uncouples from the carriage slot 120. Consequently, the carriage 111 continues to move without guiding the locking pin 116.

Starting from the closed position, the locking pin 116 is initially arranged in the first region 122, for example. Due to the orientation substantially in the Z direction of the carriage slot 120, the locking pin 116 is moved together by the carriage 111 along the longitudinal direction X, when said carriage 111 is displaced along the longitudinal direction X. The locking pin 116 is initially locked in an immovable manner relative to the carriage 111 along the X direction.

Due to the helical shape 121, the locking pin 116 is rotated 100× about the longitudinal axis 112 or the longitudinal direction 100× by interacting with the locking slot 131. The rotation takes place, in particular, about 90°, until the locking pin 116 reaches the second region 123 of the carriage slot 120.

Between the state in which the locking pin 116 is locked relative to the carriage 111, and the state in which a relative movement between the locking pin 116 and the carriage 111 along the longitudinal direction is released 100× independently of one another, the locking pin 116 performs a rotation about 90°±5°. For example, the locking pin 116 is initially oriented substantially along the transverse direction Y. Due to the rotation, the locking pin 116 is oriented substantially along the Z direction when it has left the carriage slot 120.

FIGS. 7 to 11 show different views of the slot housing 130 according to an exemplary embodiment.

The slot housing 130 has a housing wall 139. The housing wall 139 surrounds the locking slot 131. The locking slot 131 has a helical shape 132. The locking slot 131 comprises a first region 133, which extends substantially along the transverse direction Y. The first region 133 is arranged at the back in the longitudinal direction X.

Figure 11:
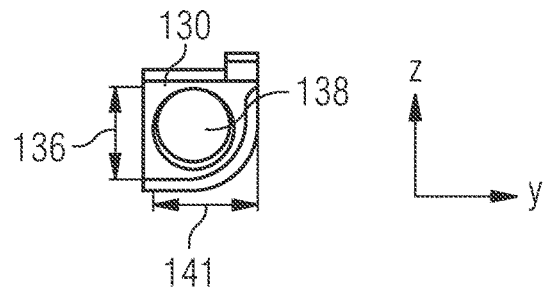
Figure 12:
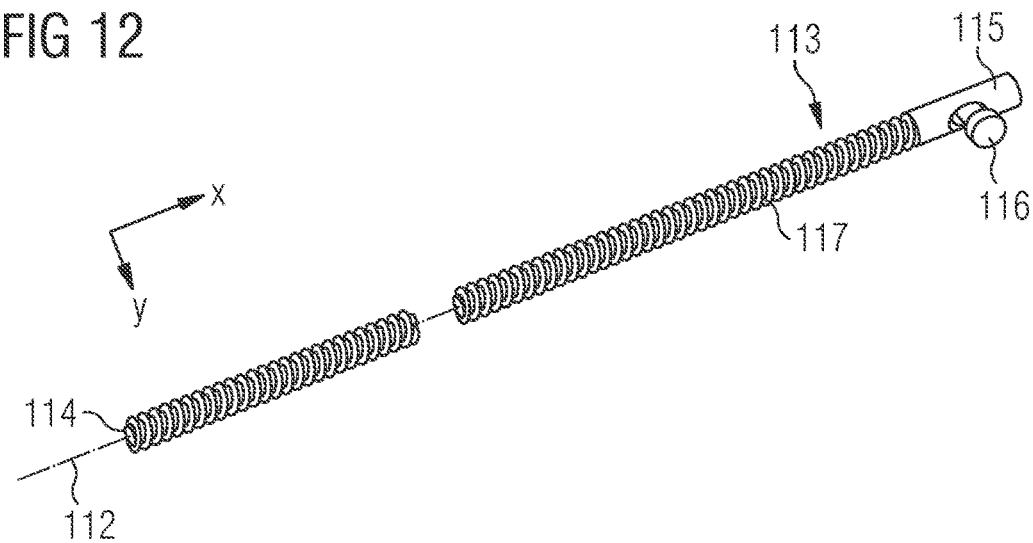
Figure 13:
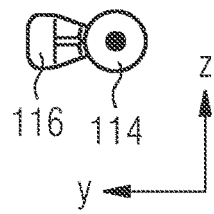
Figure 14:
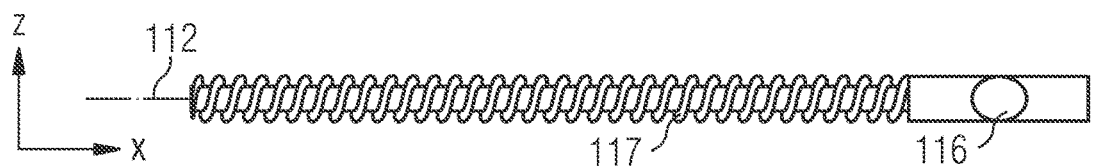
Figure 15:
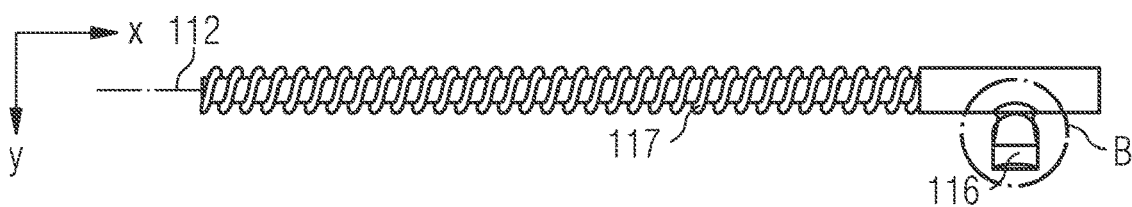

The locking slot 131 has a second region 134. The second region 134 extends substantially along the longitudinal direction X. A intermediate region 135 is formed between the first region 133 and the second region 134. The intermediate region 135 extends in a curved shape. The first region 133 is arranged at an interval 136 from the second region 134 along the vertical direction Z (FIG. 11). The first region 133 is arranged at an interval 141 from the second region 134 along the transverse direction Y (FIG. 11).

A slot course 140 (FIG. 17) of the locking slot 131 first extends along the longitudinal direction X, then helically with a component along the longitudinal direction X, the transverse direction Y, and the vertical direction Z, and subsequently along the transverse direction Y.

The housing wall 139 therefore delimits the locking slot 131 in such a manner that said locking slot 131 has a three-dimensional slot course 140 (FIG. 17). In particular in the intermediate region 135, the slot course 140 has one component along the longitudinal direction X and also one component in the transverse direction Y, and one component in the vertical direction Z. The part of the housing wall 139 closing the side region undergoes a 90° turn between the first region 133 and the second region 134.

During operation, the locking pin 116 is initially arranged in the first region 133, starting with the cover 103 in the closed position. The locking pin 116 is initially guided in the locking slot 131 in such a manner that a relative movement along the longitudinal direction X between the locking pin 116 and the slot housing 113 is released.

At the rear end of the locking slot 131 in the longitudinal direction X, said locking slot 131, in particular the intermediate region 135, forces the locking pin 116 to rotate about the longitudinal axis 112. This takes place particularly through interaction with the carriage slot 120. The locking pin 116 is, in particular, rotated by roughly 90° about the longitudinal axis, so that said locking pin is arranged in the second region 134.

In the second region 134, a movement of the locking pin 116 along the longitudinal direction X relative to the slot housing 130 is blocked. The housing wall 139 of the slot housing 130 blocks a movement of the locking pin 116 along the longitudinal direction X. Consequently, the deployment element 113 is also locked along the longitudinal direction X.

In the first region 133, the locking pin 116 is, for example, substantially oriented along the transverse direction Y. In the second region 134, the locking pin 116 is oriented substantially along the vertical direction Z, for example.

The slot housing 130 has a recess 138. During operation, the deployment element 113 extends through the recess 138, which is arranged at an end of the slot housing 130 adjacent to the second region 134. Consequently, a coupling of the locking pin 116 with the locking slot 131 is possible, a majority of the deployment element 113 being arranged outside the slot housing 130.

An angle 142 (FIG. 9) between the longitudinal axis 112 and the slot course 140 in the second region 134 is, in particular, 90°±10°, in particular 90°±1°. The slot course 140 extends in the second region 134, in particular perpendicularly to the longitudinal axis 112. The housing wall 139 of the slot housing 130 therefore limits the movement of the locking pin 116 perpendicularly to the longitudinal axis 112. The main forces which act on the locking pin 116 and the deployment element 113 during operation occur along the longitudinal axis 112, when the locking pin 116 is arranged in the second region 134. Due to the perpendicular orientation of the housing wall 139 in the second region 134 of the slot housing 130, no substantial force components act on the locking pin 16 along the vertical direction Z or along the transverse direction Y. Consequently, reliable locking of the locking pin 116 is possible.

The slot housing 130 has two grooves 137 in the second region 134. More or fewer than two grooves 137 can also be provided. The locking pin 116 has corresponding flexible projections 118 (FIG. 16). In the locked state, the flexible projections 118 engage with the grooves 137, and in so doing additionally lock the locking pin 116 in the second region 134 of the locking slot 131. This simple form of locking is sufficient, as no substantial forces occur during operation which can move the locking pin 116 out of the second region 134 in an unwanted fashion.

FIGS. 12 to 16 show the deployment element 113 with the locking pin 116 according to an exemplary embodiment in different views. The locking pin 116 projects radially, so that it can come into engagement with both the carriage slot 120 and the locking slot 131. The locking pin 116 has a locking region 144. The locking region 144 is designed to be guided in the locking slot 131. The locking pin 116 has a carriage region 143. The carriage region 143 is designed to be guided in the carriage slot 120. The carriage region 143 is configured at an end of the locking pin 116 facing away from the deployment element 113. The locking region 144 is configured between the deployment element 113 and the carriage region 143. The flexible projections 118 are configured on the locking region 144. The locking region 144 and the carriage region 143 are jointly configured, in particular on a single locking pin 116.

During operation, the locking pin 116 extends at least partially through the locking slot 131 into the carriage slot 120. During operation, the locking pin 116 is guided at least partially in both the carriage slot 120 and in the locking slot 131. In particular, when the locking pin 116 is arranged in the second region 134 of the locking slot 131, the locking pin 116 is only guided in the locking slot 131 and not in the carriage slot 120.

FIG. 17 shows a perspective depiction of part of the assembly 200. The locking pin 116 projects radially in respect of the longitudinal axis 112. The locking pin 116 extends through the slot housing 130 and projects beyond the slot housing 130. In particular, the carriage region 143 of the locking pin projects beyond the slot housing 130. The carriage region 143 of the locking pin 116 is arranged in the carriage slot 120.

The carriage slot 120 and the locking slot 131 therefore jointly prescribe the movement along the longitudinal direction X and the rotation about the longitudinal axis 112 of the locking pin 116. The slot courses 127 and 140 run counter to one another and, in particular, are offset relative to one another. The carriage 111 and the slot housing 130 can be displaced relative to one another along the longitudinal direction X. A rotation or a movement along the transverse direction Y or a movement along the vertical direction Z between the carriage 111 and the slot housing 130 is not possible. The first region 122 of the carriage slot 120 interacts primarily with the second region 134 and the intermediate region 135 of the locking slot 131.

Due to the slot course 127 of the carriage slot 120, the locking pin 116 is displaced by the carriage 111 along the first region 134 in the longitudinal direction X and then rotated in the intermediate region 135. This rotation is possible since the carriage slot 120 also has the curved intermediate region 124. The locking pin is particularly rotated about 90°. The rotation of the locking pin for locking and unlocking does not run, in particular, in a single plane. The rotation of the locking pin for locking and unlocking takes place, in particular, in all three spatial directions.

The first region 133 of the locking slot 131 interacts with the second region 123 of the carriage slot 120. The second region 123 with the open end 128 allows the locking pin 116 to be locked along the longitudinal direction X in the first region 133 of the locking slot 131.

The rotation of the locking pin 116 about the longitudinal axis 112 can also be seen once again from FIGS. 18 and 19.

FIG. 18 shows the locking pin 116 in the intermediate region 135 of the locking slot 131. The locking pin 116 is shown in an intermediate position, in which it is neither oriented completely along the transverse direction Y nor completely along the vertical direction Z.

When there is a relative movement of the carriage 111 relative to the slot housing 130, the carriage slot 120 and the locking slot 131 force the locking pin 116 to rotate.

Consequently, the locking pin 116 is turned into the position which is depicted in FIG. 19. The flexible projections 118 engage with the grooves 137. The locking pin 116 is held by the housing walls 139 of the slot housing 130, which extend in a YZ plane. Forces, which are transmitted to the locking pin 116 by means of the deployment element 113, act primarily along the longitudinal axis 112 or else the longitudinal direction X. Due to the vertical orientation of the housing wall 139 in the first region 133 of the locking slot 131, these forces do not cause the locking pin 116 to rotate out of the first region 133. This rotation is only caused by means of the carriage 111 and the carriage slot 120.

The assembly 200 allows a reduction in switching noises, friction losses, and sudden movements during locking, which can traditionally occur during locking and which do not allow 90° locking. The three-dimensionally intersecting carriage slot 120 and locking slot 131 are at 90° to one another. Consequently, longitudinal forces in the movement direction of the deployment element 113 can also be avoided. A self-locking effect can therefore be achieved. Additional separate components for securing the locking pin 116 in the locking position can be avoided. Complex tolerance chains, due to multiple components which engage differently from one another, can be avoided. The assembly 200 can be realized comparatively cost-effectively. A mechanical forced control can be realized simply and without electronic components. The assembly 200 uses all three spatial directions in the form of the two helical slots 120 and 131, which are configured to run in opposite directions to one another. The carriage slot 120 and the locking slot 131 interact with the locking pin 116 that can be rotated about the longitudinal axis 112. During operation, the locking pin 116 performs a 90° rotation about the longitudinal axis 112.

In order to secure the locking pin 116 in the locking position, the locking slot 131 is provided with the groove 137. The flexible projections 118, which can also be referred to as lugs, can clip into the groove 137. The torsional spring action of the cable 117 provides additional support for the securing of the locking pin 116 in the locking position.

The assembly 200 allows a 90° cross-locking. This means that reduced switching noises and a self-locking effect in relation to accidental unlocking under force are achieved.

Alternatively or in addition, the assembly 200 allows reduced complexity and greater robustness in terms of tolerance observation through forced control. For example, a collection funnel for the locking pin 116 is formed at the open end 128. This has a spring design with an overlap in respect of the locking slot 131, for example, and can therefore accept tolerance layers of the slot housing 130 and/or the carriage 111 and/or the locking pin 116. Production of the elements of the assembly 200 is, moreover, MRP-compliant; in other words, compliant with systematic material requirement planning, with the inclusion of capacities where necessary.

The individual elements of the assembly 200 can be combined with one another in modular fashion. Components which are used for locking can be inserted and adopted independently of the curvature. The curvature in this case relates to a curvature of the cover 103 and/or of the guide rail 107, for example. The length of the cable 117 can set differently in the mold, depending on the vehicle roof 101. The mold for production, in particular for the overmolding and production of the locking pin 116, can therefore be used for different embodiments of the vehicle roof 101. Disturbing noises which traditionally occur with rigid locking levers or control rods can be avoided. In addition, production is cost-effective. There is no need for a project-specific stamping tool to be supplied for a control rod. Alternatively or in addition, there is no need for a project-specific encapsulation mold to be supplied for a control rod. The overmolded control rod with securing spring, which is traditionally often used, can be dispensed with. Instead of this, the overmolded cable 117 that can be used in modular fashion for different projects is used. The locking slot 131 and the carriage slot 120 can be integrated into elements which already exist. The development cost and/or the development risk can be reduced due to possibilities for the locking element to be adopted in different projects.

Redundant securing of the lock of the locking pin 116 by means of a torsional spring and clip catch mechanism is possible. This involves the flexible projections 118 latching with the groove 137. For this purpose, the locking slot 131 is deformed in the elastic range, for example, and acts as a spring. Where there are loads along the longitudinal direction X of the cable 117, the engagement of the projection 118 with the groove 117 has a self-locking effect in respect of rotation.

The locking mechanism by means of the two helical slots 120, 130 can be used for a vast array of mechanical systems, in which two sliding elements are coupled to one another and uncoupled. There is a latching possibility in the locking slot 131.

Simple, cost-effective and reliable locking and unlocking is therefore achieved overall.

Figure 20A:
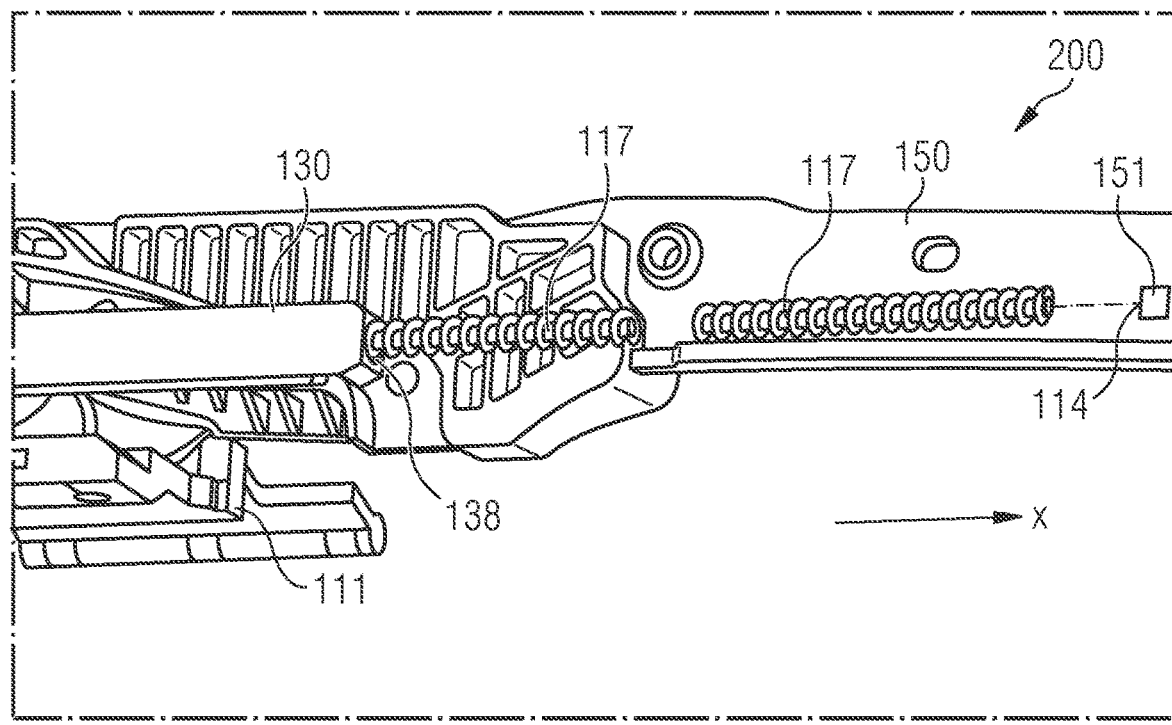
Figure 20B:
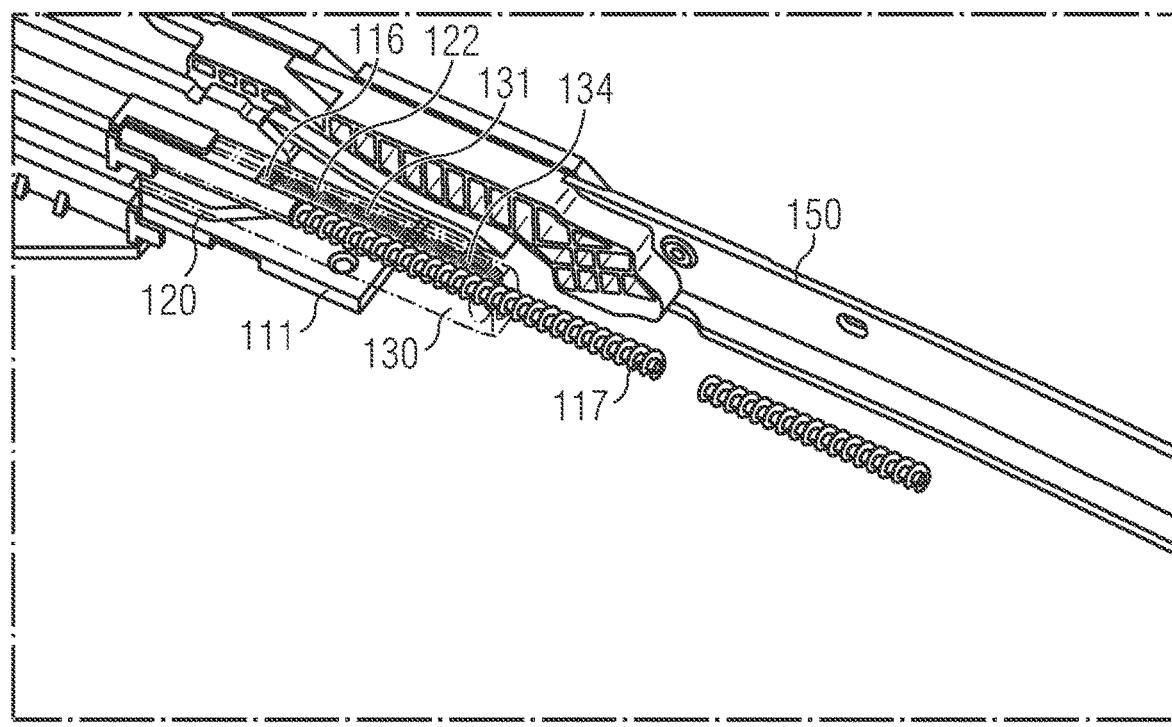
Figure 25A:
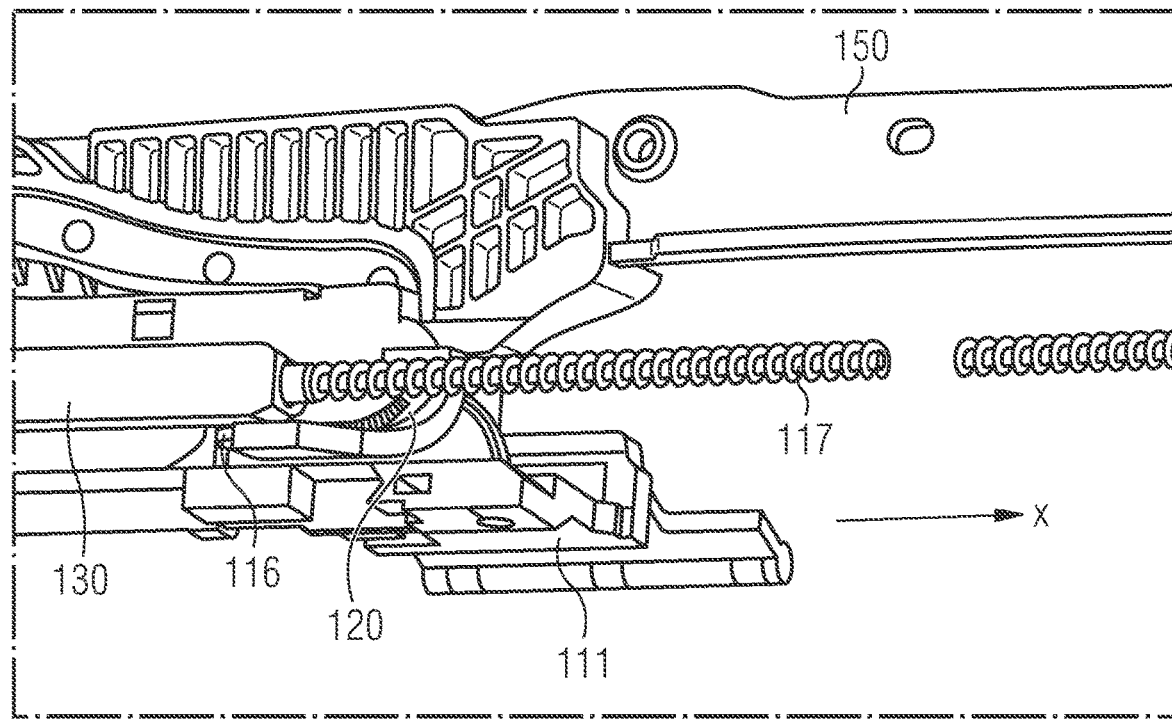
Figure 25B:
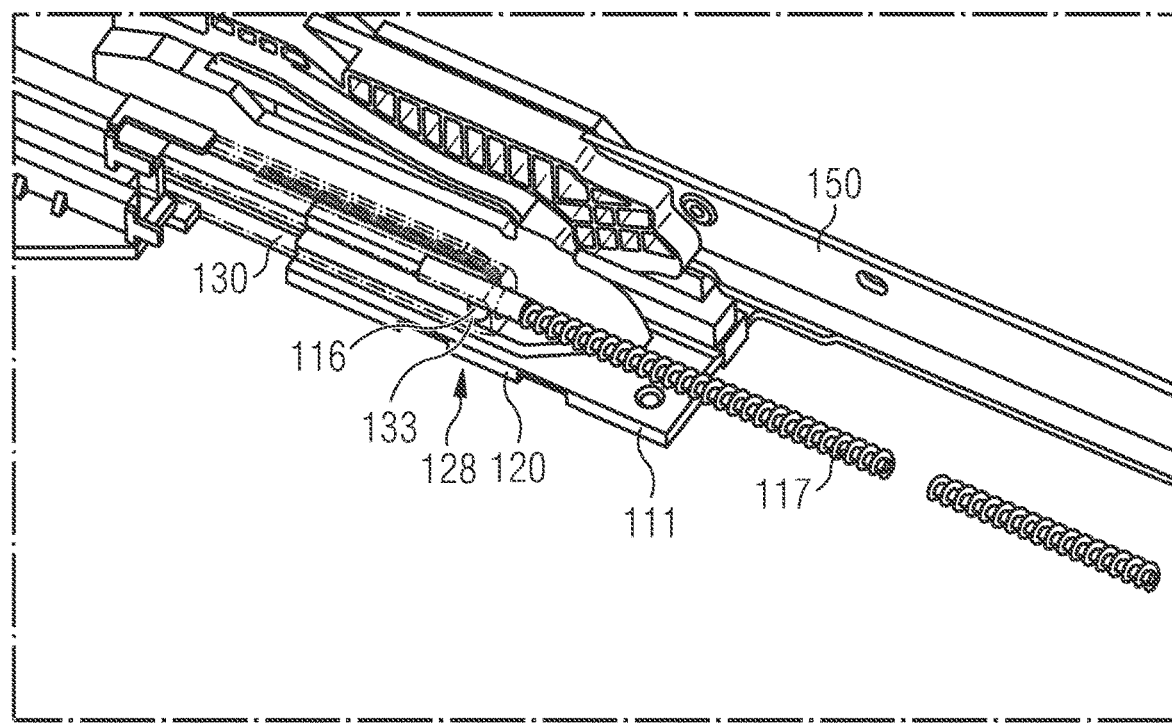
Figure 26A:
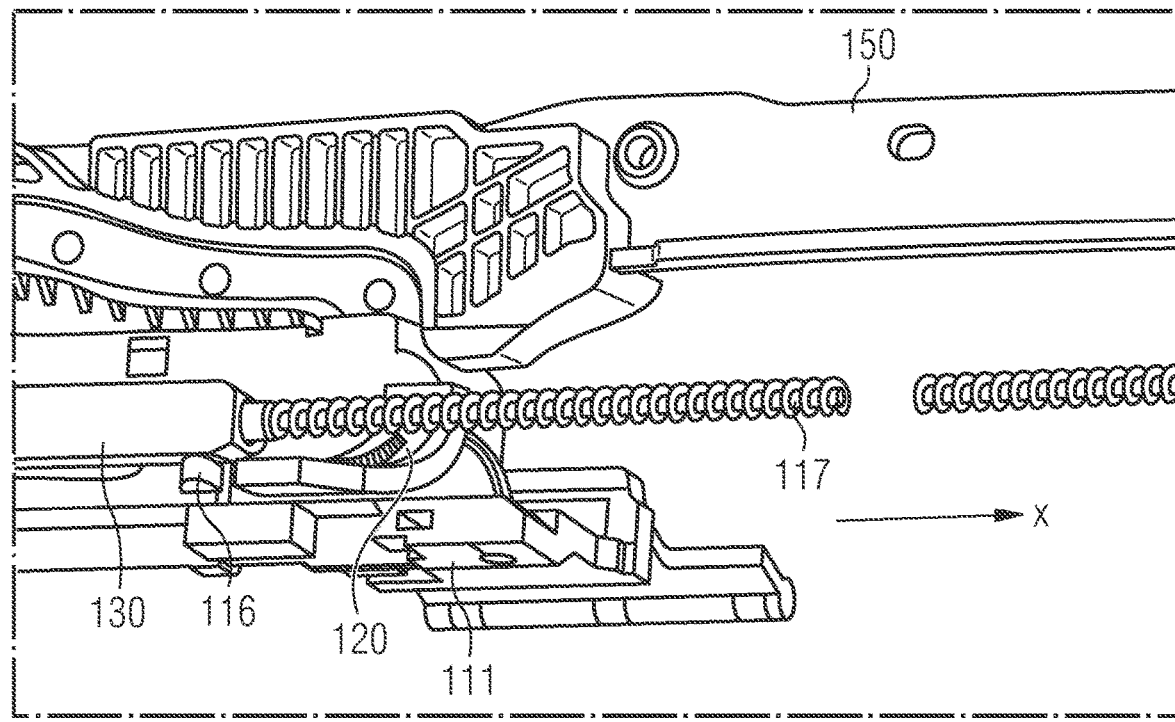
Figure 26B:
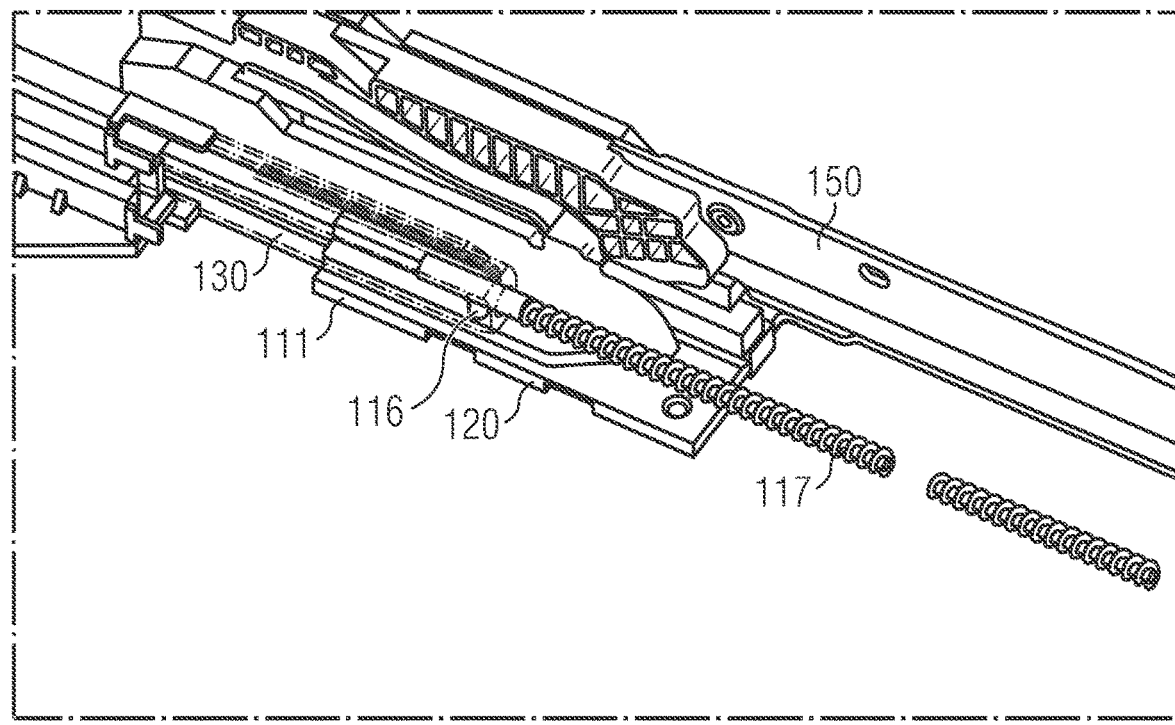

FIGS. 20A, B, to FIGS. 26A, B, each show the assembly 200 according to an exemplary embodiment at different points in time in a movement sequence of the assembly 200. In this case, FIGS. 20A to 26A each show a perspective view from below. FIGS. 20B to 26B each show a perspective view from above.

FIGS. 20A, B, show the assembly 200 in a position in which the cover 103 closes the roof opening 102. The cover 103 is connected to a cover carrier 150. The cover carrier 150 is used to couple the cover 103 to the deployment mechanism or the assembly 200.

In the exemplary embodiment shown, the assembly 200 is configured in the manner of a spoiler roof. The mechanical component 110 is configured as the rear deployment lever 151. The rear deployment lever 151 is used to raise a rear edge 106 of the cover 103. When the cover 103 is displaced along the X-direction relative to the rest of the vehicle roof, the rear deployment lever 151 is locked with the guide rail 107. The cover 103 is displaced along the X-direction relative to the deployment lever 151, in order to be displaced into its open position. The exemplary embodiment in FIGS. 20A, B, to 26A, B, differs from the exemplary embodiment which is shown in FIG. 1 in this respect.

The rear deployment lever 151 is locked by means of the cable 117 and the locking pin 116 together with the locking slot 131, as explained below.

In order to swivel out the rear deployment lever 151, the carriage 111 is displaced in the X direction. The locking pin 116 is arranged in the first region 122 of the carriage slot 120. The carriage 111 therefore takes the locking pin 116 along in the X-direction. The movement of the carriage 111 in the X direction is transmitted to the locking pin 116. The movement of the locking pin 116 in the X-direction in the locking slot 131 is released, since the locking pin 116 is arranged in the second region 134 of the locking slot 131. The second region 134 of the locking groove 131 also extends in the X direction and does not therefore block the movement of the locking pin 116.

The displacement of the locking pin 116 along the X-direction leads to a displacement of the cable 117 in the X-direction. The displacement of the cable 117 leads to deployment of the rear deployment lever 151. This in turn leads to a lifting of the rear edge 106 of the cover 103 in the Z-direction.

Figure 21A:
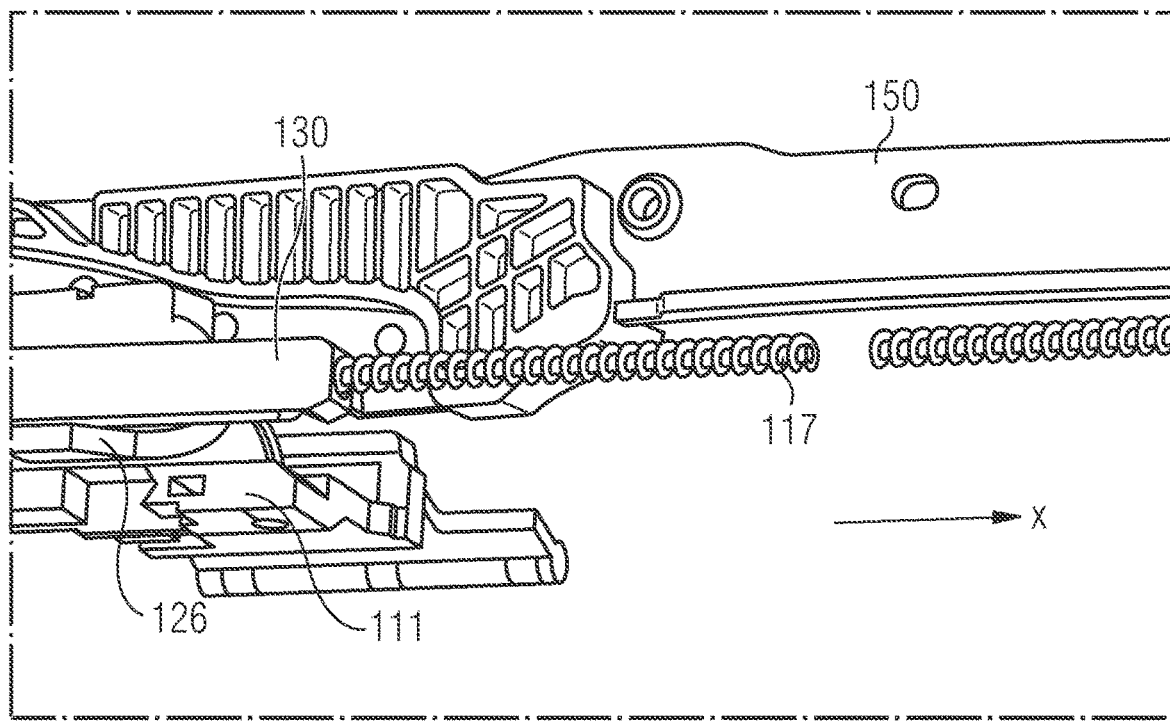
Figure 21B:
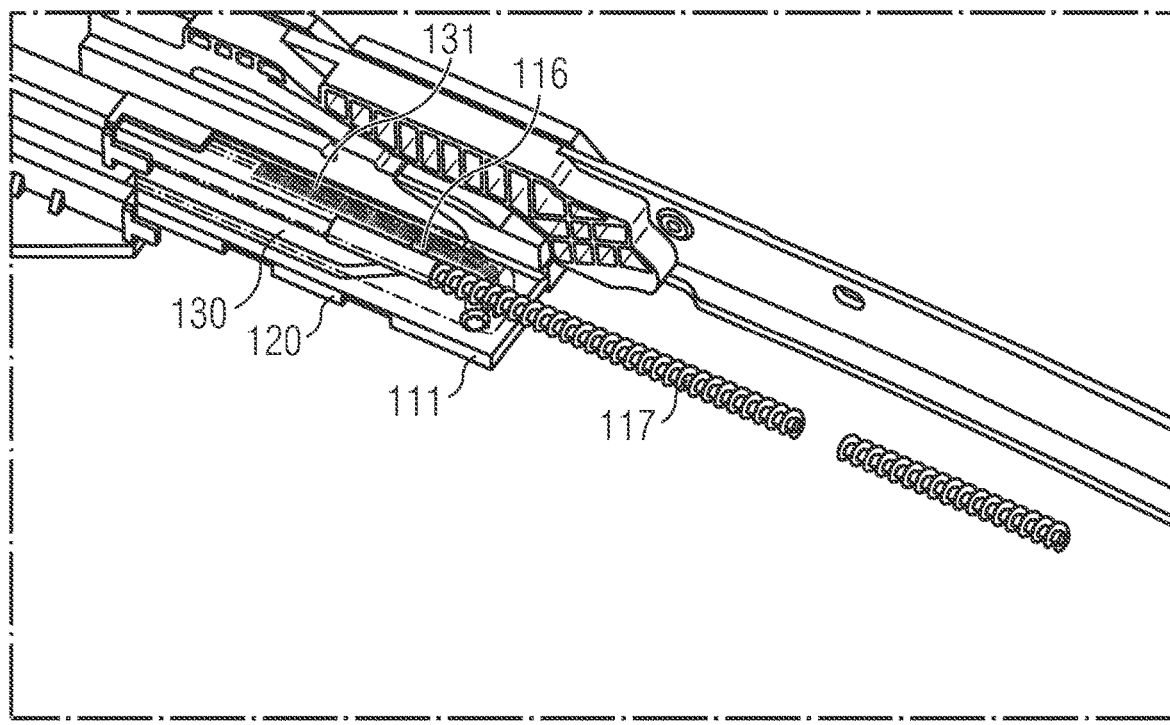

In FIGS. 21A, B, the carriage 111 is displaced further in the X direction. Due to the locking, the locking pin is carried along in the carriage slot 102 in the X direction, as said locking pin is furthermore arranged in the second region 134 of the locking slot 131. This results in a further deployment of the deployment lever 151. In this case, the carriage 111 moves in the X direction relative to the cover carrier 150. A movement of the cover carrier 150 in the X direction is blocked and is only released at a later point in time.

Figure 22A:
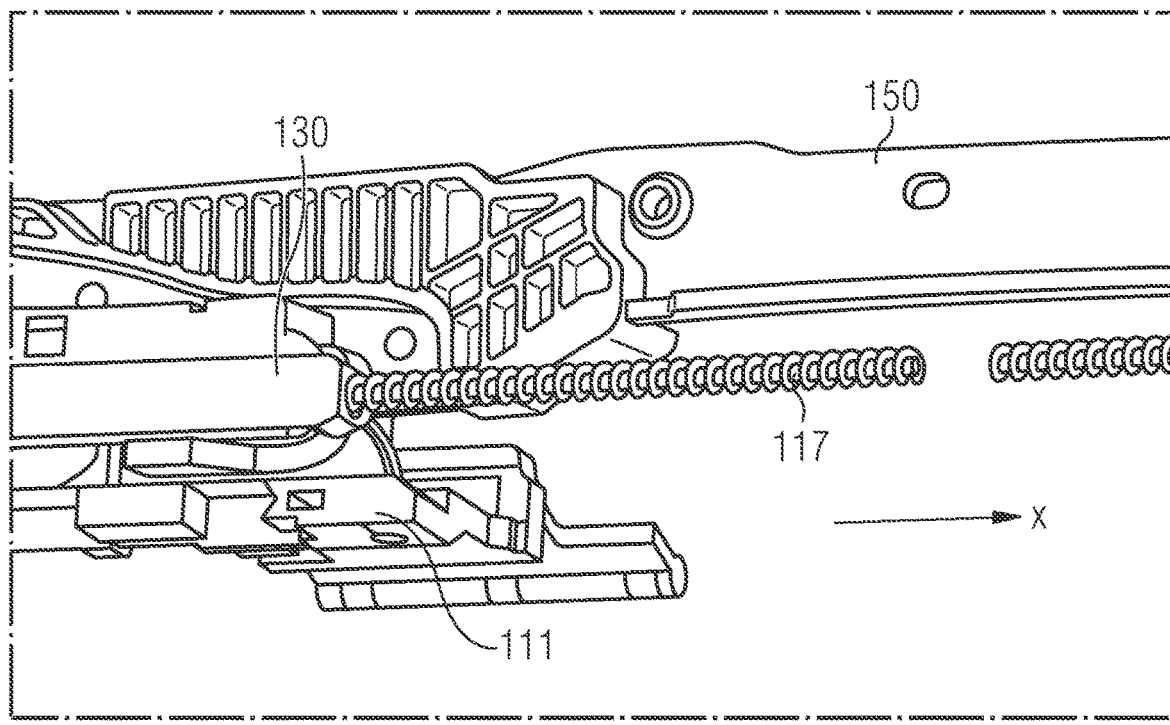
Figure 22B:
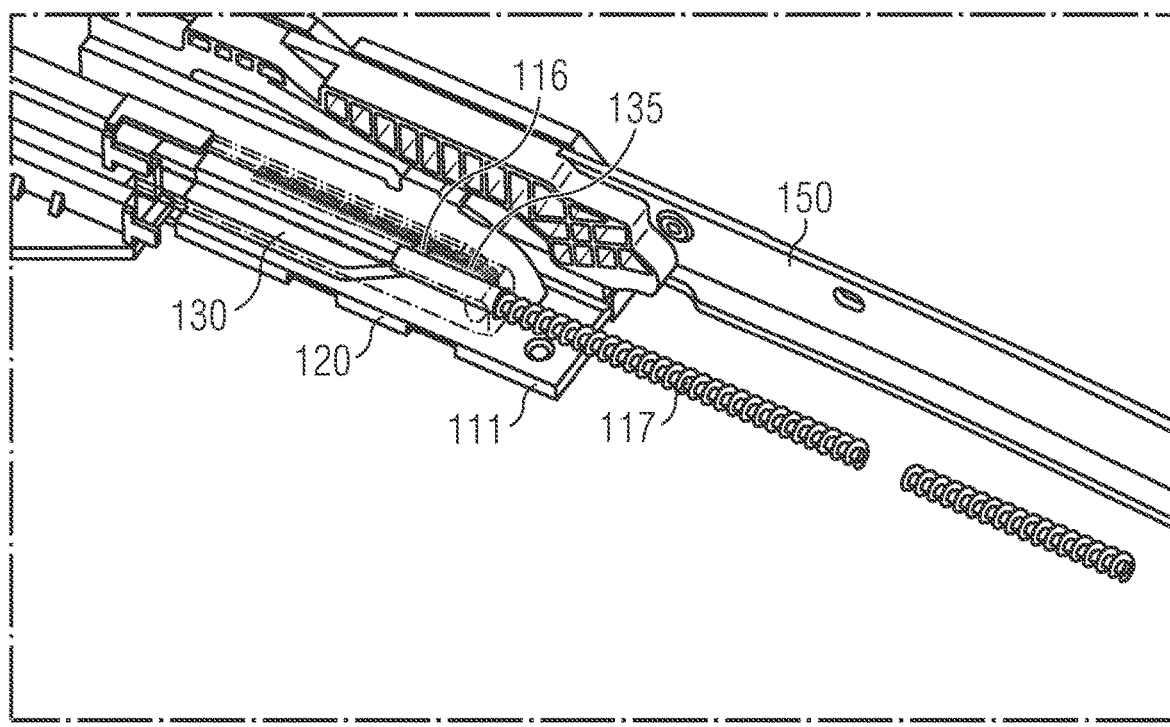

FIGS. 22A, B, show the locking pin 116 when it was displaced along the X-direction to that end of the second region 134 of the locking slot 131. The deployment lever 151 is completely deployed. The cable 117 is then uncoupled from the carriage movement 111 and the cable 117 is locked to the guide rail 107. The deployment lever 151 is then also locked by means of the cable 117.

Figure 23A:
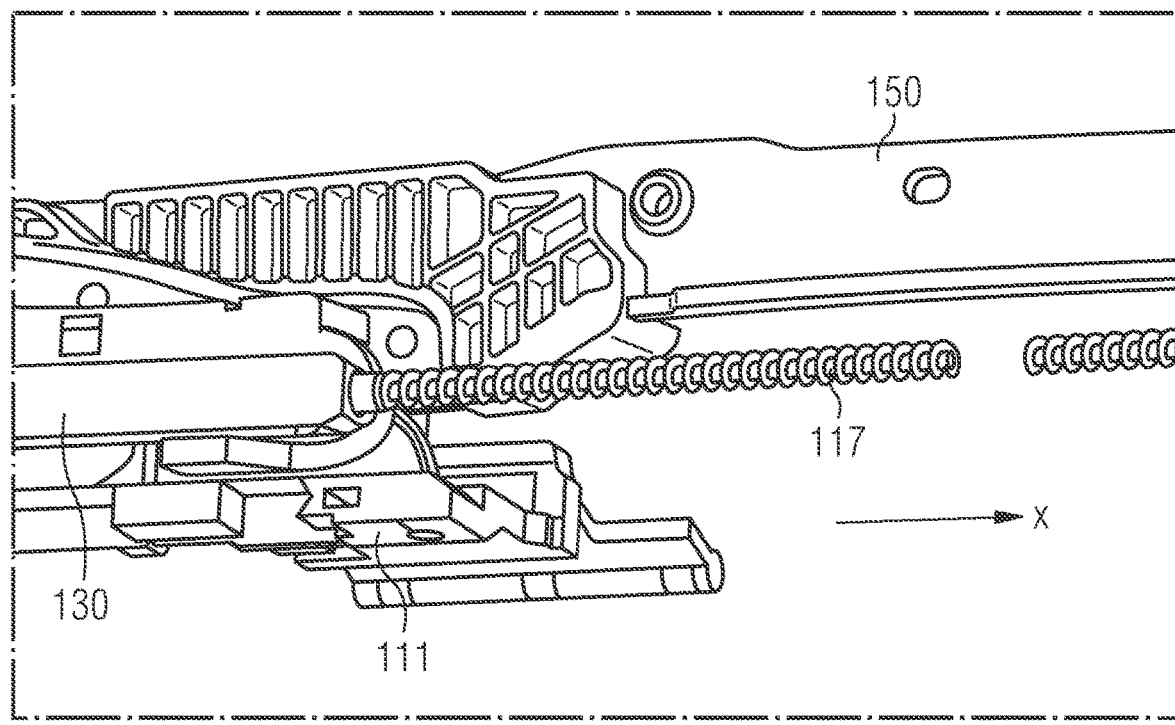
Figure 23B:
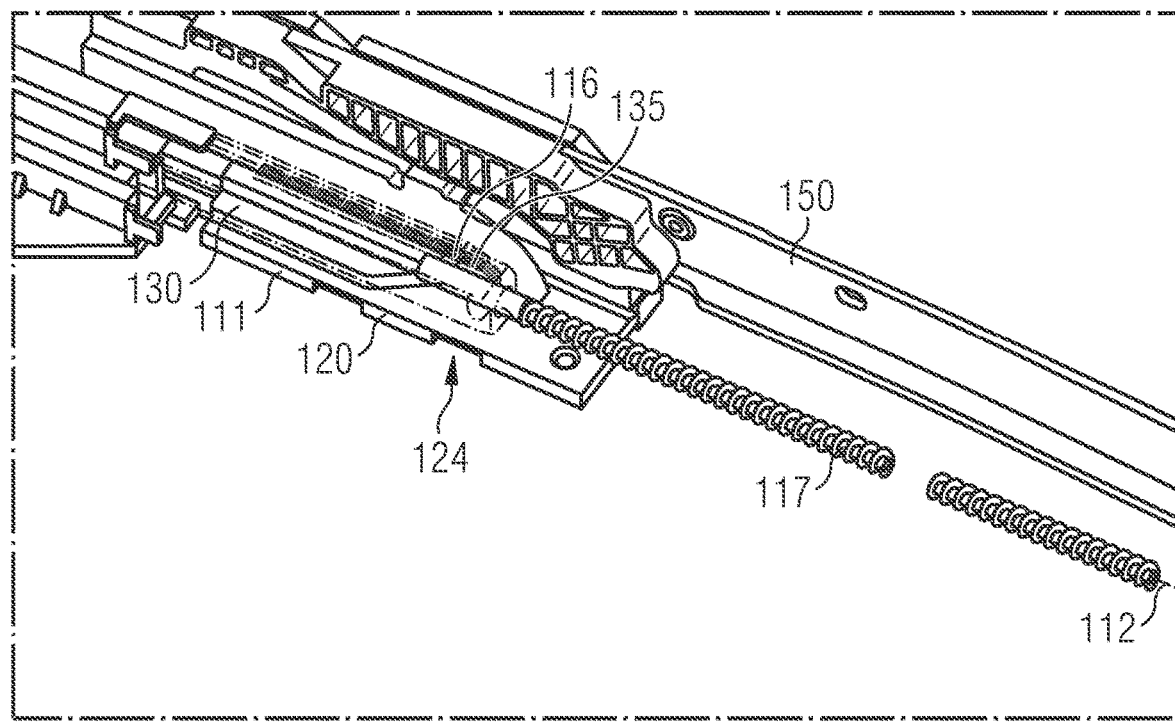

FIGS. 23A, 23B show the locking pin 116 in the intermediate region 135 of the locking groove 131, and also in the intermediate region 124 of the carriage groove 120. The helical shape 121, 132 of the two slots 120, 131 leads to a rotation of the locking pin 116 about the longitudinal axis 112 of the cable 117. The fact that the helical shapes 121, 132 of the two slots 120, 131 run in opposite directions means that the displacement of the carriage 111 in the X direction causes the locking pin 116 to rotate. The carriage slot 120 presses the locking pin 116 in the intermediate region 124 in the X direction during displacement of the carriage 111 in the X direction. The helical shape 121 of the carriage slot 120 and the helical shape 132 of the locking slot 131 transform this force in the X direction into forces in the negative Z direction, and in the Y direction into a force which causes the locking pin 116 to rotate.

Figure 24A:
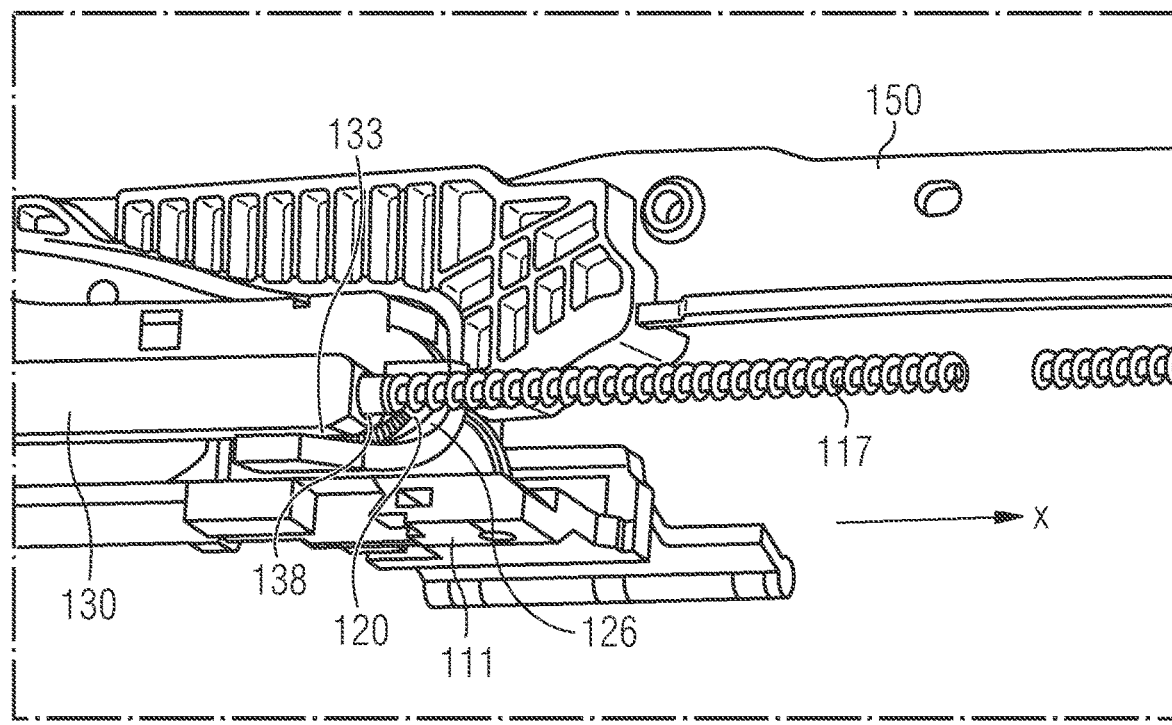
Figure 24B:
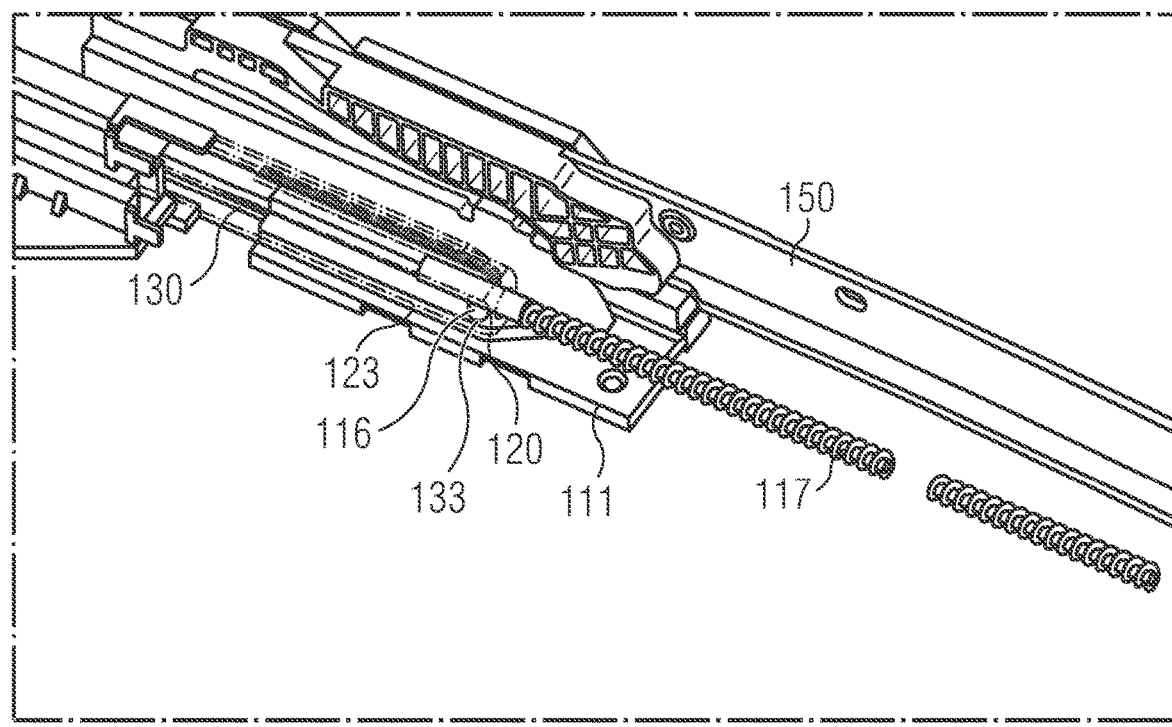

FIGS. 24A, B show the locking pin 116 following a complete rotation about 90°. The locking pin 116 is arranged in the first region 133 of the locking slot 131. Consequently, the locking pin 116 is blocked along the X direction relative to the slot housing 130. This blocking of the locking pin 116 also leads to a blocking of the cable 117. This in turn leads to a blockade of the deployment lever 151 to prevent pivoting. The deployment lever 151 is therefore locked relative to the slot housing 130 by means of the cable 117 and the locking pin 116. The cover carrier 150 and the cover 103 are located in the ventilation position, in which the rear edge 106 is raised in the Z direction substantially above the front edge 105.

The further movement of the carriage 111 in the X direction is released relative to the locking pin 116. The locking pin 116 is arranged in the second region 123 of the carriage slot 120. Said carriage slot extends substantially along the X direction and does not thereby block a relative movement between the carriage slot 120 and the locking pin 116 along the X direction. The carriage 111 can be displaced further in the X direction relative to the locking pin 116, and therefore relative to the cable 117 and the deployment lever 151.

The further deployment of the carriage 111 leads, for example, to a raising of the front edge 105 of the cover 103, and subsequently to a displacement of the cover 103 in the X direction relative to the rest of the vehicle roof 101, in order to release the roof opening 102. For this purpose, the carriage 111 is coupled with the cover carrier 150, for example, in this state and/or unlocked, such that the cover carrier 150 follows the movement of the carriage 111 in the X direction.

FIGS. 25A, B, show the state in which the locking pin 116 leaves the carriage slot 120 at the open end 128, since the carriage 111 is displaced further in the X direction. The locking pin 116 and the cable 117 no longer follow this movement of the carriage, since the locking pin is locked in the X direction relative to the slot housing 130 due to the orientation of the first region 133 of the locking slot 131. An unwanted rotation of the locking pin 116 from the first region 133 of the locking slot 131 is avoided by means of a torsional force of the cable 117, for example. Alternatively or in addition, the unwanted turning-out is avoided by means of the flexible projections 118 being in engagement with the grooves 137, as can also be seen from FIG. 19, in particular.

Even if there is a further displacement of the carriage 111 in the X direction, in order to displace the cover 103, the cable 117 therefore remains securely locked in the slot housing 130 with the locking pin 116, as depicted in FIGS. 26A, B. The further raising and displacement of the cover carrier 150 without a simultaneous displacement of the deployment lever 151 is therefore reliably possible. The carriage 111 subsequently displaces the cover carrier 150 in the X direction relative to the deployment lever 151, which is securely held by means of the cable 117 and the locking pin 116.

A closing movement of the cover takes place in a corresponding manner to the opening action described, but in reverse order.

REFERENCE SIGNS

100 Vehicle
101 Vehicle roof
102 Roof opening
103 Cover
104 Windscreen
105 Front edge
106 Rear edge
107 Guide rail
108 Drive cable
110 Mechanical component
111 Carriage
112 Longitudinal axis
113 Deployment element
114 First end
115 Second end 116 Locking pin
117 Cable
118 Flexible projection
120 Carriage slot
121 Helical shape
122 First region
123 Second region
124 Intermediate region
125 Interval
126 Carriage wall
127 Slot course
128 Open end
129 Interval
130 Slot housing
131 Locking slot
132 Helical shape
133 First region
134 Second region
135 Intermediate region
136 Interval
137 Groove
138 Recess
139 Housing wall
140 Slot course
141 Interval
142 Angle
143 Carriage region
144 Locking region
150 Cover carrier
151 Deployment lever
200 Assembly
X Longitudinal direction
Y Transverse direction
Z Vertical direction

The invention claimed is:

1. An assembly for moving a cover for a vehicle roof, comprising:
   a mechanical component coupled to the cover,
   a carriage which is guided in a guide rail,
   a deployment element which is extended in an elongate manner along a longitudinal axis, wherein
   the mechanical component is coupled to the deployment element at a first end of said deployment element, to transmit a movement of the carriage along a longitudinal direction in sections to the mechanical component,
   a locking pin is arranged at a second end of the deployment element,
   the locking pin can be rotated about the longitudinal axis of the deployment element, to be moved between a first state and a second state, wherein the deployment element is locked in the first state preventing movement along the longitudinal direction relative to the carriage, and is locked in the second state preventing movement along the longitudinal direction relative to the guide rail.

2. The assembly according to claim 1, wherein the deployment element comprises a cable with compressive and tensile strength.

3. The assembly according to claim 1, wherein the carriage has a carriage slot which interacts with the locking pin, to move the locking pin between the first state and the second state.

4. The assembly according to claim 3, wherein the carriage slot has a helical shape.

5. The assembly according to claim 3, wherein the carriage slot has a first region extending along the vertical direction and a second region extending along the longitudinal axis, wherein the first region and the second region are arranged spaced apart from one another along a transverse direction.

6. The assembly according to claim 3, wherein a slot course of the carriage slot comprises one component in the longitudinal direction, one component in the vertical direction, and one component in the transverse direction.

7. The assembly according to claim 1, wherein the guide rail has a locking slot which interacts with the locking pin, to move the locking pin between the first state and the second state.

8. The assembly according to claim 7, wherein the locking slot has a helical shape.

9. The assembly according to claim 7, wherein the locking slot has a first region extending along a transverse direction and a second region extending along the longitudinal axis, wherein the first region and the second region are arranged spaced apart from one another along the vertical direction.

10. The assembly according to claim 7, wherein a slot course of the locking slot has one component in the longitudinal direction,
    one component in the vertical direction, and
    one component in the transverse direction.

11. The assembly according to claim 2, wherein the locking pin projects through the locking slot in the first state and is engaged with the carriage slot.

12. The assembly according to claim 1, wherein the locking pin is rigidly fixed to the deployment element.

13. The assembly according to claim 1, wherein the locking pin has a flexible projection which engages with a groove in the guide rail in the second state.

14. The assembly according to claim 1, wherein the mechanical component is a lever for raising and lowering the cover.

15. A method for moving a cover for a vehicle roof comprising:
    displacing of a deployment element extended along a longitudinal axis in an elongate manner along a longitudinal direction, which has a locking pin,
    resulting in
        moving of a mechanical component to move the cover,
        rotating of the locking pin about the longitudinal axis of the deployment element, and therefore
        moving of the locking pin between a first state and a second state,
    wherein the deployment element is locked in the first state preventing movement along the longitudinal direction relative to a carriage, and in the second state preventing movement along the longitudinal direction relative to a guide rail.

* * * * *